United States Patent
Adams et al.

(10) Patent No.: US 10,182,522 B2
(45) Date of Patent: Jan. 22, 2019

(54) DEPTH CONTROL OF AN AGRICULTURAL FERTILIZER ROW UNIT

(71) Applicant: CNH Industrial America LLC, New Holland, PA (US)

(72) Inventors: Brian T. Adams, Centralia, MO (US); Keith W. Wendte, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/407,582

(22) Filed: Jan. 17, 2017

(65) Prior Publication Data

US 2018/0199498 A1   Jul. 19, 2018

(51) Int. Cl.
| | |
|---|---|
| *A01C 5/06* | (2006.01) |
| *A01C 23/02* | (2006.01) |
| *A01B 49/06* | (2006.01) |

(52) U.S. Cl.
CPC .............. *A01B 49/06* (2013.01); *A01C 5/062* (2013.01); *A01C 23/024* (2013.01); *A01C 23/025* (2013.01)

(58) Field of Classification Search
CPC ......... A01C 5/062; A01C 5/06; A01C 23/024; A01C 23/023; A01C 23/02; A01C 23/00; A01C 23/025; A01B 49/06; A01B 49/04; A01B 49/00

See application file for complete search history.

(56) References Cited

U.S. PATENT DOCUMENTS

| | | | |
|---|---|---|---|
| 4,646,620 A | 3/1987 | Buchl | |
| 5,351,635 A * | 10/1994 | Hulicsko | A01B 61/046 |
| | | | 111/135 |
| 6,085,846 A | 7/2000 | Buchl et al. | |
| 6,148,747 A | 11/2000 | Deckler et al. | |
| 6,701,857 B1 | 3/2004 | Jensen et al. | |
| 6,983,705 B1 | 1/2006 | Gust | |
| 7,308,859 B2 | 12/2007 | Wendte et al. | |
| 7,360,494 B2 | 4/2008 | Martin | |
| 7,481,278 B1 | 1/2009 | Pomedli et al. | |
| 7,743,718 B2 | 6/2010 | Bassett | |

(Continued)

FOREIGN PATENT DOCUMENTS

EP         0 761 084 A1    3/1997

*Primary Examiner* — Christopher J. Novosad
(74) *Attorney, Agent, or Firm* — Rebecca L. Henkel; Rickard K. DeMille

(57) ABSTRACT

A fertilizer row unit including a toolbar coupling, first and second suspension members, a pressure applying device, a tensioned wheel assembly, a knife assembly and a depth control system. The first suspension member has a first end pivotally coupled to the toolbar coupling. The second suspension member is generally parallel to the first suspension member. The pressure applying device is coupled to the first or second suspension member. The tensioned wheel assembly has at least one wheel. The knife assembly is pivotally coupled to both the first and second suspension members. The depth control system is coupled to the knife assembly for controlling the depth of penetration of the knife into the soil. The depth control system includes a sensor that provides a measured depth signal representative of a depth of the knife. The depth control system controls the pressure applying device dependent upon the measured depth signal.

18 Claims, 4 Drawing Sheets

(56) References Cited

U.S. PATENT DOCUMENTS

| | | |
|---|---|---|
| 7,946,232 B2 | 5/2011 | Patwardhan et al. |
| 8,078,367 B2 | 12/2011 | Sauder et al. |
| 8,186,287 B2 | 5/2012 | Schilling et al. |
| 8,235,130 B2 | 8/2012 | Henry et al. |
| 8,448,717 B2 | 5/2013 | Adams et al. |
| 8,479,669 B2 | 7/2013 | Shoup |
| 8,544,397 B2 | 10/2013 | Bassett |
| 2012/0125244 A1 | 5/2012 | Beaujot |
| 2013/0032363 A1 | 2/2013 | Curry et al. |
| 2013/0213676 A1 | 8/2013 | Bassett |

* cited by examiner

DEPTH CONTROL OF AN AGRICULTURAL FERTILIZER ROW UNIT

BACKGROUND OF THE INVENTION

1. Field of the Invention

The present invention relates to agricultural implements, and, more particularly, to a depth control system used by a fertilizer row unit of an agricultural implement.

2. Description of the Related Art

The application of fertilizer and more particularly liquid fertilizer over the surface of the ground has been widely practiced for many years, but has been found to be unsatisfactory because the fertilizer penetrates the surface of the soil relatively slowly, which results in part of the fertilizer evaporating before it is absorbed by the soil. Also, rainfall can wash away much of the fertilizer that remains on the surface. To overcome these problems, placement of liquid fertilizer in a depth of the soil has been carried out and has been found to be beneficial to plant growth.

Fertilizer blade assemblies are typically employed by farmers to deliver nitrogen enriching fertilizers such as anhydrous ammonia to a targeted zone beneath the surface of the soil of a crop field while causing a minimum of disruption to the structure of the upper layer of the top soil. Fertilizer blade assemblies are often used by farmers to keep the disturbance of the soil at a minimum. By preserving the structure of the upper layer of top soil, the moisture retaining capacity of the soil is retained and it also makes it easier for new crop plants to put down roots. Typically, fertilizer implements carry patterns of fertilizer blade assemblies spaced for the simultaneous delivery of fertilizer to a multitude of parallel furrows created by the blades.

Fertilizer implements, such as the Case New Holland Nutri-Placer 940, are designed to apply fertilizer and specifically anhydrous ammonia during seed bed preparation. The fertilizer implement generally consists of a tool bar or main frame that can be hitched to a tractor other towing vehicle. Blades, or combinations of working tools, such as shanks, coulters, knives, banders, and the like, can be mounted to the main frame and are designed to manage crop residue, improve soil tilth, and band plant food in the root zone. As the blades are pulled through the soil, fertilizer, such as anhydrous ammonia, is routed from a tank hitched to the trailing end of the implement to fertilizer outlets integrally formed or mounted adjacent the blades.

A problem with these systems is that a downward pressure is maintained by the system that is offset by supporting gauge wheels, which wastes energy or causes unnecessary soil disturbance or compaction.

What is needed in the art is a depth control system that is responsive to a selected depth, is energy efficient and leaves the soil in an optimal state.

SUMMARY OF THE INVENTION

The present invention provides a depth control system for a fertilizer applicator system.

The invention in one form is directed to a fertilizer row unit including a toolbar coupling, first and second suspension members, a pressure applying device, a tensioned wheel assembly, a knife assembly, and a depth control system. The first suspension member has a first end pivotally coupled to the toolbar coupling. The second suspension member is generally parallel to the first suspension member. The pressure applying device is coupled to the first or second suspension member. The tensioned wheel assembly has at least one wheel. The knife assembly is pivotally coupled to both the first and second suspension members. The depth control system is coupled to the knife assembly for controlling the depth of penetration of the knife into the soil. The depth control system includes a sensor that provides a measured depth signal representative of a depth of the knife. The depth control system controls the pressure applying device dependent upon the measured depth signal.

The invention in another form is directed to a fertilizer applicator having a plurality of fertilizer row units. Each fertilizer row unit including a toolbar coupling, first and second suspension members, a pressure applying device, a tensioned wheel assembly, a knife assembly and a depth control system. The first suspension member has a first end pivotally coupled to the toolbar coupling. The second suspension member is generally parallel to the first suspension member. The pressure applying device is coupled to the first or second suspension member. The tensioned wheel assembly has at least one wheel. The knife assembly is pivotally coupled to both the first and second suspension members. The depth control system is coupled to the knife assembly for controlling the depth of penetration of the knife into the soil. The depth control system includes a sensor that provides a measured depth signal representative of a depth of the knife. The depth control system controls the pressure applying device dependent upon the measured depth signal.

An advantage of the present invention is that optimum performance of the implement occurs during field operation in that maintaining an optimal depth thereby minimizes the draft required for the implement and minimize losses of anhydrous ammonia due to inadequate application depth.

Another advantage is that the present invention lessens the chance of damage to an implement in the field by always applying the correct amount of down pressure to the row unit.

Yet a further advantage is that the present invention reduces operator fatigue, especially in fields that have varying soil conditions, and saves the operator a lot of time when switching from field to field.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
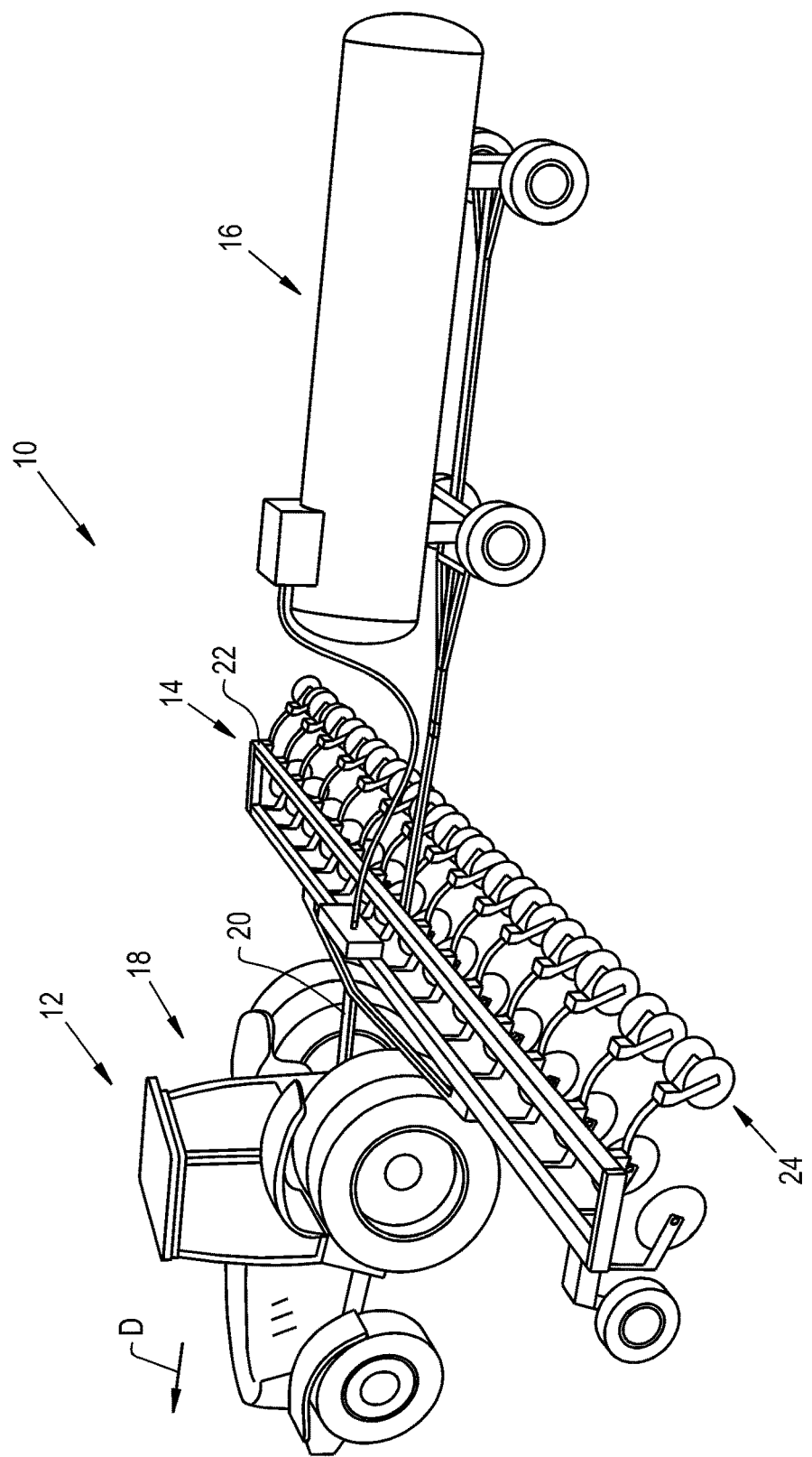
FIG. 1 is a top perspective view of an agricultural implement in the form of a pull-type fertilizer applicator having an embodiment of row units of the present invention incorporated therein.

Referring now to the drawings, and more particularly to FIG. 1, there is shown an embodiment of a fertilizer application system 10 including a tractor 12, a fertilizer applicator 14 and a supply tank 16. Tractor 12 has a control system 18 that includes an input mechanism to ensure that a selected fertilizer application depth is maintained by providing a signal to the depth control system 90 (FIG. 6) of the present invention. Tractor 12 is coupled to fertilizer applicator 14 by way of a hitch 20 that is connected to a toolbar 22. Fertilizer row units 24 are coupled to toolbar 22. As system 10 proceeds in a direction D, liquid fertilizer from supply tank 16 is supplied to a distribution system that supplies the fertilizer to the individual row units 24 for subterraneous application of the fertilizer in the soil.

Figure 2:
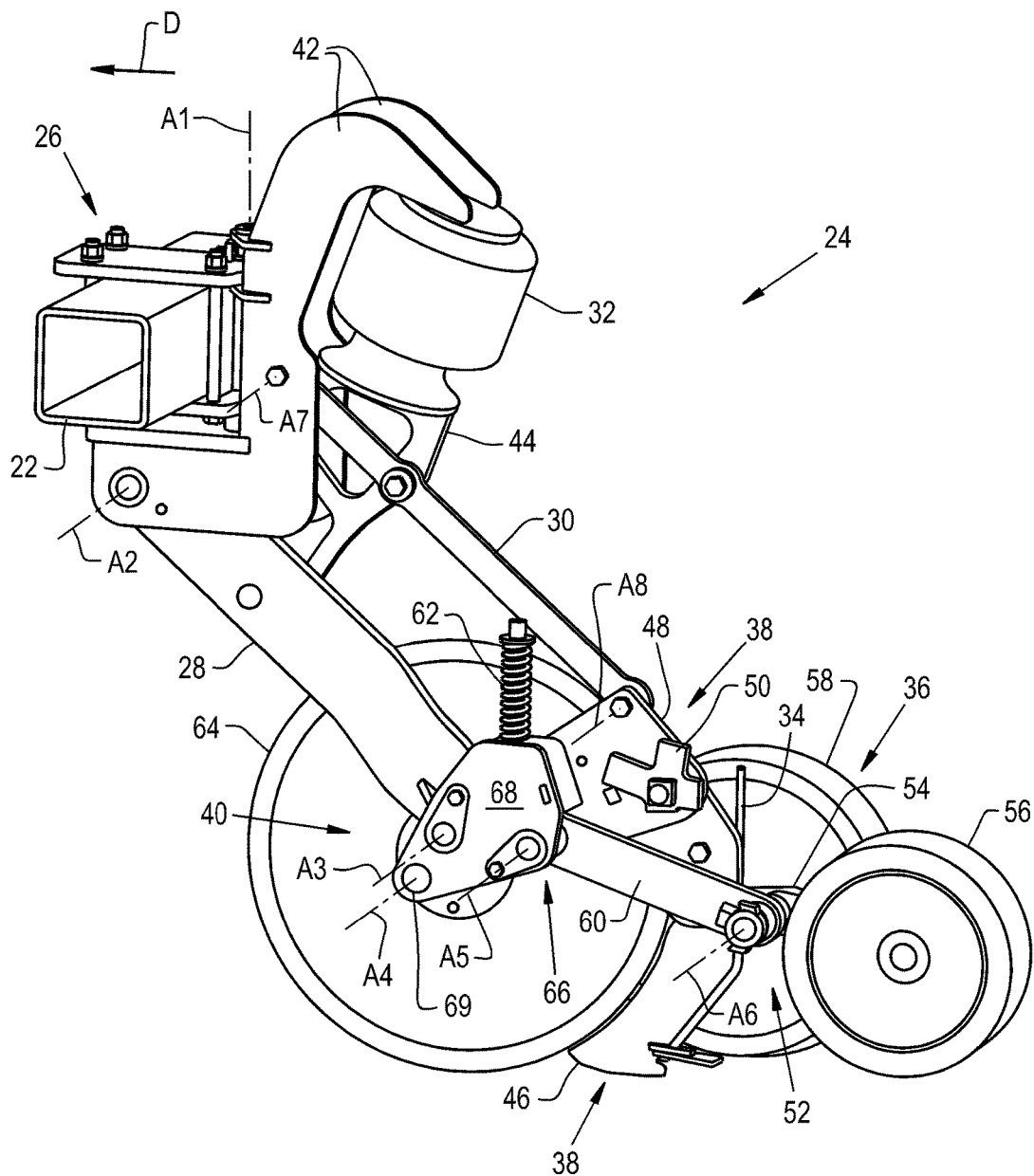
FIG. 2 is a close up view of the row units of FIG. 1.

Now, additionally referring to FIG. 2, there is shown a single fertilizer row unit 24 coupled to a representative portion of toolbar 22 by way of a toolbar coupler 26. Each fertilizer row unit 24 includes the toolbar coupler 26, suspension members 28 and 30, a pressure applying device 32, a fertilizer delivery device 34, a tensioned wheel assembly 36, a knife assembly 38, and a depth control system 40, 90. Item 40 illustrating the mechanical aspects and item 90 illustrating the active controlling elements, together being collectively referred to as depth control system 40, 90. Further, row unit 24 also includes brackets 42, and a member 44. Knife assembly 38 includes a knife blade 46, a plate 48, and a cam 50. Tensioned wheel assembly 36 includes a walking axle system 52, a walking axle member 54, a press wheel 56, a gauge wheel 58, a pivotal member 60 and a tension device 62.

Figure 3:
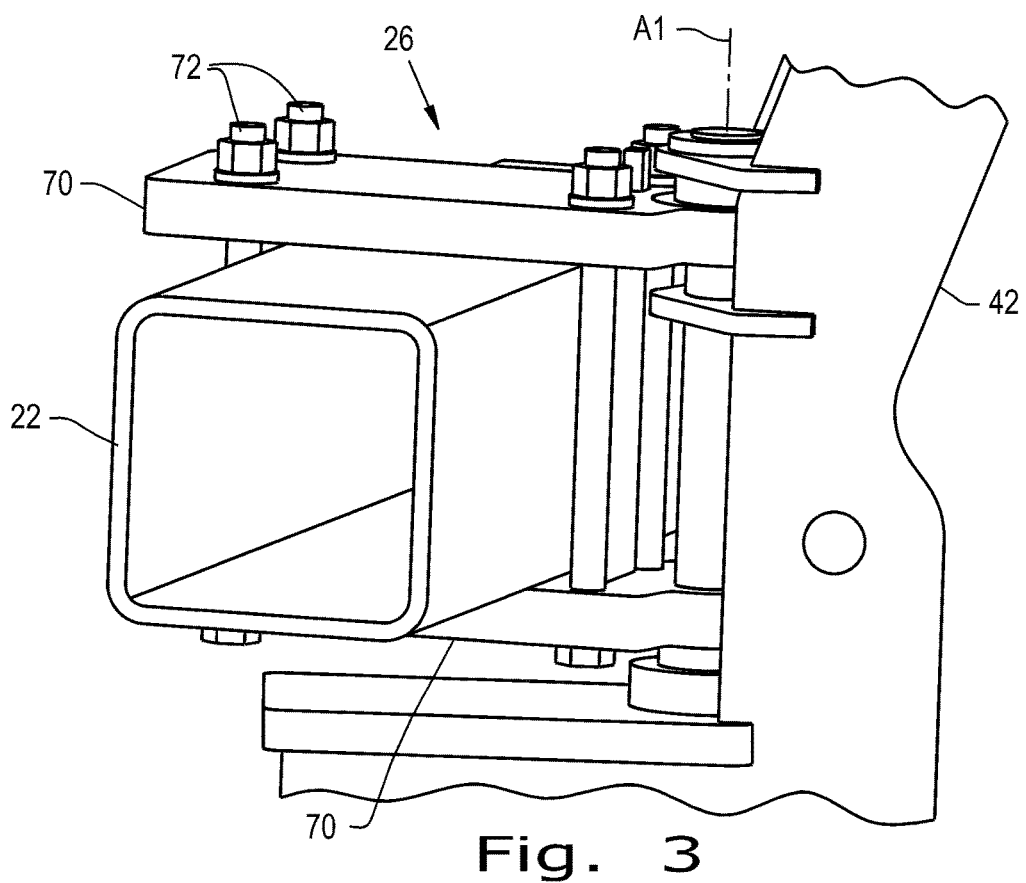
FIG. 3 is a perspective view of the mounting connection of the row units of FIGS. 1 and 2 to a toolbar.
Figure 4:
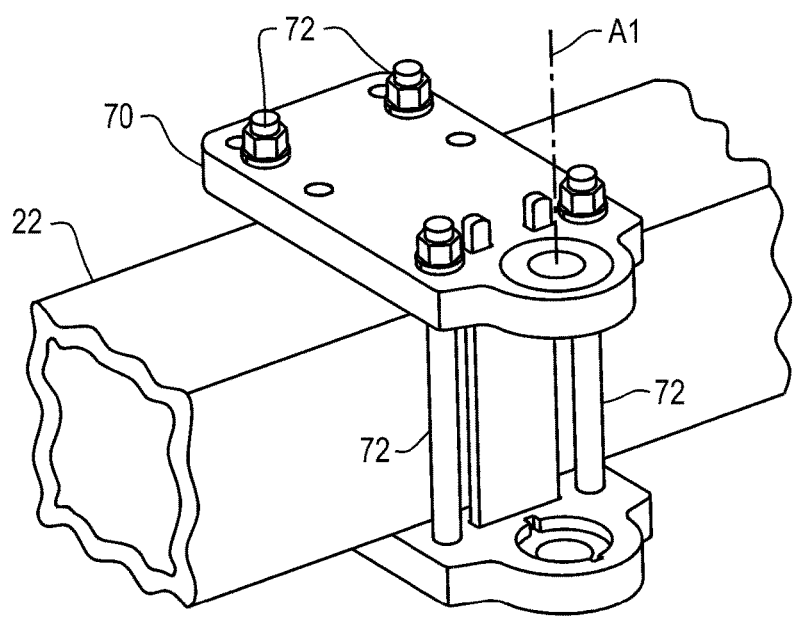
FIG. 4 is a perspective view of part of the hinged mounting of the row units of FIGS. 1 and 2.

Now additionally referring to FIGS. 3 and 4, there are shown some additional details of toolbar coupler 26 having plates 70 coupled to toolbar 22 by way of bolts 72.

During operation, fertilizer applicator 14 is lowered to the ground and is pulled by tractor 12 in direction D the depth of knife blade 46 is controlled by depth control system 40, 90 that includes a sensor 66 to measure the position of pivotable member 60 to create a measured depth signal. This signal is used by the depth control system 40, 90 to compare to the selected fertilizer application depth signal, also referred to herein as a target depth signal, and to minimize the difference by adding or removing pressure on members 28 and 30 by way of pressure applying device 32. Pressure applying device 32 is illustrated herein as a bellows or a sleeve style air spring 32 that has compressed air or fluid therein at a pressure selected by depth control system 40, 90.

Brackets 42, members 28 and 30 and plate 48 form a parallelogram arrangement so that the pressure applied by way of pressure applying device 32 is applied to knife assembly 38 as well as to an opening disk 64, which is attached to a plate 68 by way of an axle 69, which can be in the form of a welded stud bolt 69. Opening disk 64 rotates about axis A4. Tension device 62, which is a spring 62, tensions wheel assembly 36 so that gauge wheel 58 and closing, or press wheel 56 maintain a firm pressure on the ground. Wheel 56 tracks immediately behind or aft of knife blade 46 as row unit 24 moves in direction D. Walking axle member 54 couples wheels 56 and 58 on opposite sides thereof, allowing the outer perimeters of each wheel to overlap relative to direction D.

As pivotable member 60 can move over a pivotal range, cam 50 is selected to limit the pivotal range by having four different lengths, which are selected by the operator, to serve as a maximum depth of knife blade 46 that is allowed by tensioned wheel assembly 36. Pivotable member 60 has sensor 66 coupled thereto to provide the measured depth signal representative of the depth that the fertilizer is being applied, which relates directly to the depth of knife 46 in the soil.

Toolbar coupling 26 allows for the pivotal movement of row unit 24 about axis A1, which is an upright axis that is generally vertical during field operations and may be canted from vertical when applicator 14 is raised by tractor 12. Suspension member 28 is pivotally coupled to bracket 42 of coupling 26 about axis A2. Axis A2 is generally horizontal and is fore of axis A1 relative to the direction of travel D of row unit 24. The opposite end of suspension member 28 is pivotable about axis A3. Suspension member 30 is also pivotally coupled to bracket 42, of coupling 26, about axis A7. Plate 48 is pivotally connected to member 30 about axis A8, and also to member 28 about axis A3. Axes A3 and A8 as well as axis A4 allow the forward profile of knife blade 46 to move along the outer circumference of disk 64. Pivotal member 60 is pivotally coupled about axis A5 and axis A6.

In the prior art, traditional fertilizer applicators use row units with either knife or a disk coulter assembly to apply liquid/dry fertilizer or anhydrous ammonia to the soil. Many of those applicators (especially the ones with a coulter assembly design) use a gauge wheel to ensure that the exact depth is maintained for applying the nutrients. In those cases, a coiled spring is typically used to keep the row unit in the ground with enough pressure so that the gauge wheel is controlling the depth. If the operator encounters a hard spot in the field, the spring may not apply enough down force to the row unit to make sure the coulter is operating at the proper depth. The only prior art solution in this case is to adjust the spring so that more force is applied to the row unit. Some units are fixed to the toolbar and the depth of application is controlled by adjusting the height of the toolbar. The spring acts as a pressure relief when an obstruction is encountered. The press wheel provides firming (not gauging) until it hits the travel stop.

Another problem with prior art systems arise when an operator decides that they would like to apply the fertilizer deeper than the current set depth. In this case, the operator must manually adjust the depth stop mechanism for each individual row unit and/or the height of the toolbar before continuing the operation.

Yet another problem in prior art systems is that they do not allow the fertilizer row unit to adequately track the direction of travel when farming on contours takes place. The present invention allows for the tracking of row units 24, as they are pivotal about axis A1.

Figure 5:
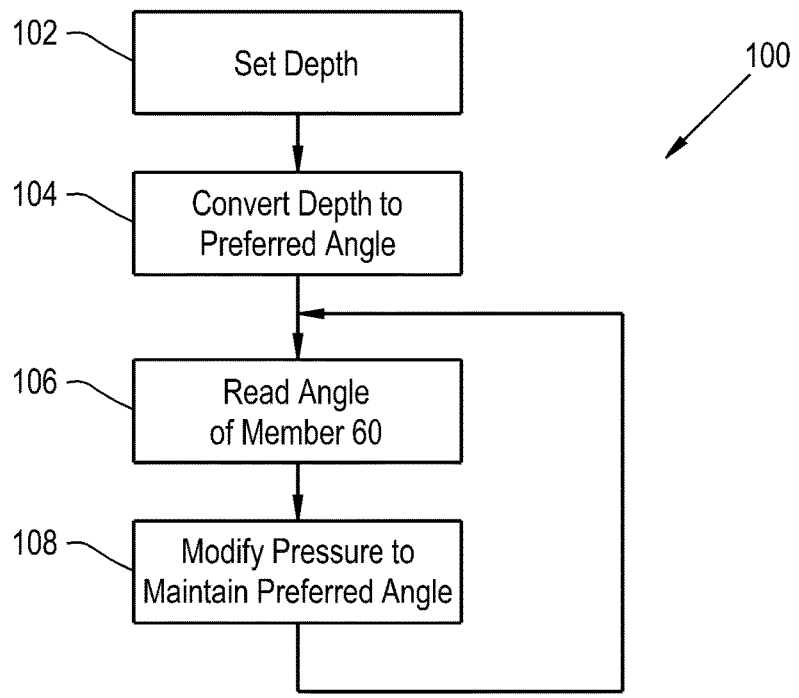
FIG. 5 is a flowchart depicting steps taken by the control system of the row unit of FIGS. 1 and 2.
Figure 6:
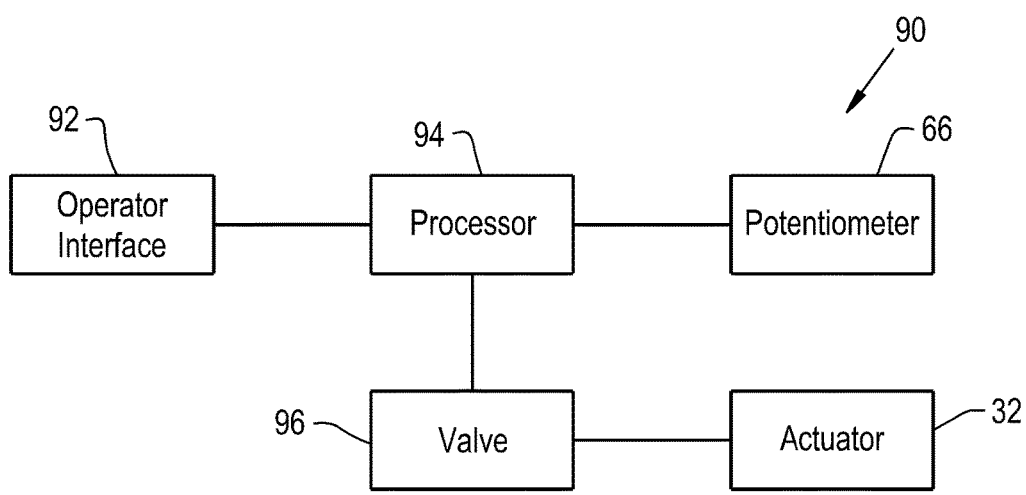
FIG. 6 is a functional block diagram of the system using the steps of the flowchart of FIG. 5.

Now, additionally referring to FIGS. 5 and 6, sensor 66 may be in the form of a potentiometer 66 or another position sensor, and is located on the row unit frame to measure the angle between it and the wheel assembly 36, which includes press wheel 56 and gauge wheel 58. A valve 96 is located on implement 14 (or tractor 12) in order to control the pressure in the actuator 32, which may be a hydraulic cylinder 32 or the pneumatic air spring 32. The tractor 12 or implement 14 must be equipped with a processor 94 that is capable of analyzing the signal from the potentiometer 66 and is able to send a control signal to the valve 96 which supplies the oil to the hydraulic cylinder or air to the pneumatic air spring 32. The tractor 12 or implement 14 is equipped with a wiring harness (not shown for purposes of clarity) to receive the potentiometer signal and to send a control signal to the valve 96.

Depth control system 90 allows the operator to set a desired depth (step 102 of method 100) in the tractor cab on an operator interface 92. The processor 94 converts this depth into a preferred press wheel angle, at step 104, to be maintained, at step 108, using the potentiometer 66 to measure the angle of member 60 that is read at step 106 for feedback purposes. This conversion can be done by a precalculated formula based on the geometry of the press wheel 56 relative to the row unit frame. A certain minimum pressure is always maintained in the hydraulic cylinder or pneumatic air spring 32. This can also be preset by the operator by way of operator interface 92. As the operator lowers the implement 14 to begin field operation, the potentiometer 66 immediately sends a signal to the processor 94 providing the current operating angle. The processor 94 determines the actual depth of the row unit 24 using the pre-calculated formula and determines if more downward force is required. If the decision is yes, a control signal is sent from the processor 94 to the pressure control valve 96 and control valve 96 provides more pressure to the hydraulic cylinder or pneumatic air spring 32. This sequence is repeated on a regular basis to ensure proper depth of the fertilizer delivery is maintained.

An electronic filter can be used to smooth out the signal from the potentiometer 66 in order to prevent the constant "hunting" phenomena by the control system 90.

Since potentiometer 66 is unable to sense the position of the press wheel 36 or 56 when the row unit 24 is in the ground at the maximum depth and the press wheel arm is resting on the travel stop of cam 50, the system will automatically send a control signal that would decrease the down pressure supplied to air spring 32, until movement of the press wheel arm 60 is detected. This ensures that the minimum amount of down pressure is being applied to the row unit, thus conserving energy and promoting a longer life for the row unit components.

Advantageously, the present inventive solution results in optimum performance of the implement during field operation. Maintaining an optimal depth to thereby minimize draft required for the implement and minimize losses of anhydrous ammonia due to inadequate application depth. Additionally, the present invention lessens the chance of damage to an implement in the field by always applying the correct amount of down pressure to the row unit. Yet further, the present invention reduces operator fatigue, especially in fields that have varying soil conditions, and saves the operator a lot of time when switching from field to field.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fertilizer row unit, comprising:
    a toolbar coupling for coupling the fertilizer row unit to a toolbar of a fertilizer applicator;
    a first suspension member having a first end pivotally coupled to the toolbar coupling about a generally horizontal axis;
    a second suspension member generally parallel to the first suspension member;
    a pressure applying device coupled to at least one of the first suspension member and the second suspension member;
    a fertilizer delivery device;
    a tensioned wheel assembly having at least one wheel that traverses across soil;
    a knife assembly including a knife blade, the knife blade having the fertilizer delivery device coupled thereto, the knife assembly being pivotally coupled to both the first suspension member and the second suspension member;
    a depth control system coupled to the knife assembly, the depth control system controlling the depth of penetration of the knife blade into the soil, the depth control system includes a depth sensor that provides a measured depth signal representative of a depth to which the knife blade extends into the soil, the depth control system controlling the pressure applying device dependent upon the measured depth signal;
    a pivoting member coupled between the at least one wheel and the depth control system; and
    a rotational cam device coupled to the knife assembly, the cam device limiting a pivotal range of the pivoting member.

2. The fertilizer row unit of claim 1, wherein the depth control system additionally receives a target depth signal from an operator, the depth control system being configured to minimize a difference between the target depth signal and the measured depth signal.

3. The fertilizer row unit of claim 1, wherein the pivoting member is also coupled to the knife assembly.

4. The fertilizer row unit of claim 1, wherein the rotational cam device has at least two distinct positions that limit the pivotal range of the pivoting member to two distinct pivotal range limits.

5. The fertilizer row unit of claim 4, wherein the rotational cam device has two additional distinct positions that limit the pivotal range of the pivoting member to four distinct pivotal range limits.

6. The fertilizer row unit of claim 1, wherein the tensioned wheel assembly includes a pivoting member coupled between the at least one wheel and to the depth control system or to the knife assembly, the at least one wheel of the tensioned wheel assembly includes a first wheel and a second wheel.

7. The fertilizer row unit of claim 6, wherein the first wheel and the second wheel are coupled to the pivoting member by way of a walking axle member.

8. The fertilizer row unit of claim 7, wherein the first wheel and the second wheel are on opposite sides of the walking axle member.

9. The fertilizer row unit of claim 8, wherein the first wheel follows the knife assembly and the fertilizer delivery device in a direction in which the row unit travels.

10. The fertilizer row unit of claim 1, wherein the toolbar coupling is pivotal along a generally upright axis.

11. The fertilizer row unit of claim 10, wherein part of the row unit is forward of the generally upright axis relative to a direction in which the row unit travels.

12. The fertilizer row unit of claim 11, wherein the first end of the first suspension member is generally horizontally pivotally coupled to the toolbar coupling fore of the generally upright axis.

13. An agricultural fertilizer applicator, comprising:
    a toolbar;

a plurality of fertilizer row units coupled to the toolbar, each fertilizer row unit including:
  a toolbar coupling for coupling the fertilizer row unit to the toolbar;
  a first suspension member having a first end pivotally coupled to the toolbar coupling about a generally horizontal axis;
  a second suspension member generally parallel to the first suspension member;
  a pressure applying device coupled to at least one of the first suspension member and the second suspension member;
  a fertilizer delivery device;
  a tensioned wheel assembly having at least one wheel that traverses across soil;
  a knife assembly including a knife blade, the knife blade having the fertilizer delivery device coupled thereto, the knife assembly being pivotally coupled to both the first suspension member and the second suspension member;
  a depth control system coupled to the knife assembly, the depth control system controlling the depth of penetration of the knife into the soil, the depth control system includes a depth sensor that provides a measured depth signal representative of a depth to which the knife blade extends into the soil, the depth control system controlling the pressure applying device dependent upon the measured depth signal;
  a pivoting member coupled between the at least one wheel and the depth control system; and
  a rotational cam device coupled to the knife assembly the depth device limiting a pivotal range of the pivoting member.

14. The agricultural fertilizer applicator of claim 13, wherein the depth control system additionally receives a target depth signal from an operator, the depth control system being configured to minimize a difference between the target depth signal and the measured depth signal.

15. The agricultural fertilizer applicator of claim 14, wherein the pivoting member is also coupled to the knife assembly.

16. The agricultural fertilizer applicator of claim 13, wherein the at least one wheel of the tensioned wheel assembly includes a first wheel and a second wheel.

17. The agricultural fertilizer applicator of claim 16, wherein the first wheel and the second wheel are coupled to the pivoting member by way of a walking axle member.

18. The agricultural fertilizer applicator of claim 13, wherein the toolbar coupling is pivotal along a generally upright axis.

* * * * *